US011216259B1

(12) United States Patent
Kwon et al.

(10) Patent No.: US 11,216,259 B1
(45) Date of Patent: Jan. 4, 2022

(54) PERFORMING MULTIPLE FUNCTIONS IN SINGLE ACCELERATOR PROGRAM WITHOUT RELOAD OVERHEAD IN HETEROGENOUS COMPUTING SYSTEM

(71) Applicant: XILINX, INC., San Jose, CA (US)

(72) Inventors: Hyun Kwon, San Jose, CA (US);
Andrew Gozillon, Glasgow (GB);
Ronan Keryell, Santa Clara, CA (US);
Tejus Siddagangaiah, San José, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/836,767

(22) Filed: Mar. 31, 2020

(51) Int. Cl.
*G06F 8/41* (2018.01)
*G06F 9/30* (2018.01)
*G06F 9/50* (2006.01)

(52) U.S. Cl.
CPC .............. *G06F 8/451* (2013.01); *G06F 8/434* (2013.01); *G06F 9/3005* (2013.01); *G06F 9/5027* (2013.01); *G06F 9/5066* (2013.01)

(58) Field of Classification Search
CPC ........ G06F 8/451; G06F 8/434; G06F 9/3005; G06F 9/5027; G06F 9/5066
See application file for complete search history.

(56) References Cited

U.S. PATENT DOCUMENTS 6,076,141 A * 6/2000 Tremblay ............ G06F 9/30021
711/108
10,599,404 B1 * 3/2020 Neto ....................... G06F 8/443

2008/0098207 A1 * 4/2008 Reid .................... G06F 11/3636
712/227
2008/0256330 A1 * 10/2008 Wang ..................... G06F 9/3851
712/24
2012/0089655 A1 * 4/2012 Erinjippuralh ........... G06F 7/38
708/204

(Continued)

OTHER PUBLICATIONS

Wang, Guibin, et al., "Kernel Fusion: An Effective Method for Better Power Efficiency on Multithreaded GPU", 2010 IEEE/ACM Intl Conference on Green Computing and Communications & Int'l Conference on Cyber, Physical and Social Computing, Dec. 18-20, 2010, INSPEC Accession No. 11862128.

(Continued)

*Primary Examiner* — Phillip H Nguyen
(74) *Attorney, Agent, or Firm* — Patterson + Sheridan, LLP (57) ABSTRACT

Examples herein describe compiling source code for a heterogeneous computing system that contains jump logic for executing multiple accelerator functions. The jump logic instructs the accelerator to execute different functions without the overhead of reconfiguring the accelerator by, e.g., providing a new configuration bitstream to the accelerator. At start up when a host program is first executed, the host configures the accelerator to perform the different functions. The methods or system calls in the host program corresponding to the different functions then use jump logic to pass function selection values to an accelerator program in the accelerator that inform the accelerator program which function it is being instructed to perform. This jump logic can be generated by an accelerator compiler and then inserted into the host program as a host compiler generates the executable (e.g., the compiled binary) for the host program.

20 Claims, 7 Drawing Sheets

(56) References Cited

U.S. PATENT DOCUMENTS

| | | | | |
|---|---|---|---|---|
| 2013/0185703 | A1* | 7/2013 | Davis | G06F 8/447 |
| | | | | 717/140 |
| 2014/0344815 | A1* | 11/2014 | Ginzburg | G06F 9/485 |
| | | | | 718/101 |
| 2015/0363227 | A1* | 12/2015 | Rachamim | G06F 9/4881 |
| | | | | 718/108 |
| 2018/0217823 | A1* | 8/2018 | Marshall | G06F 8/4441 |

OTHER PUBLICATIONS

Filipovic, Jiri, et al., "Optimizing Cuda Code by Kernel Fusion—Application on Bias", Institute of Computer Science, Masaryk University, Czech Republic, 2013 (20 pages).

Keryeli, Ronon, et al., "SYCL TM integrates OPEN CLTM devices with modern C++" Version 1.2.1, Document Revision: 6, Revision Date: Nov. 14, 2019 (268 pages).

* cited by examiner

PERFORMING MULTIPLE FUNCTIONS IN SINGLE ACCELERATOR PROGRAM WITHOUT RELOAD OVERHEAD IN HETEROGENOUS COMPUTING SYSTEM

TECHNICAL FIELD

Examples of the present disclosure generally relate to generating compiled source code for executing multiple accelerator functions.

BACKGROUND

A heterogeneous system can include a host and an accelerator where the host offloads compute tasks to the accelerator. Currently, the host executes a program where, each time the program executes, the host must first configure the accelerator to perform the function. When the program first executes, the host configures the accelerator to perform the function; thus, each time the program is called thereafter, the host does not need to re-configure the accelerator.

However, the host may rely on the same accelerator to perform different functions (e.g., execute different layers in a machine learning (ML) model, switch between data compression and decompression, or perform different tasks corresponding to wireless transmissions). Under current programming models, the host must reconfigure the accelerator as it switches between tasks. That is, once the accelerator performs a first task, the host must load another program that reconfigures (or reloads) the accelerator to execute a second task. What is needed is a programming model that permits the accelerator to perform different functions without the reload overhead involved with switching between those functions.

SUMMARY

Techniques for compiling source code for a heterogeneous computing system including a host and an accelerator are described. One example is a method that includes identifying host source code and accelerator source code, generating, using one or more computing processors executing a compiler, jump logic based on the accelerator source code where the jump logic enables the host to switch between multiple accelerator functions, generating compiled code for the host based on the host source code and the jump logic, and generating compiled code for the accelerator based on the accelerator source code.

One example described herein is a computer readable storage medium that performs an operation that includes identifying host source code and accelerator source code, generating, using one or more computing processors executing a compiler, jump logic based on the accelerator source code where the jump logic enables the host to switch between multiple accelerator functions, generating compiled code for the host based on the host source code and the jump logic, and generating compiled code for the accelerator based on the accelerator source code.

One example described herein is a method that includes executing, in a host, compiled code for the host and an accelerator where the accelerator is communicatively coupled to the host and selecting, when executing the compiled code at the host, a first function of the multiple functions where the compiled code comprises jump logic containing a function selection value indicating which of the multiple functions has been selected. The method also includes passing the function selection value to the accelerator and instructing the accelerator to perform the first function.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe techniques for compiling source code for a heterogeneous computing system that contains jump logic for executing multiple accelerator functions. As mentioned above, previously, each time the host instructs the accelerator to perform a different function, the host must first reconfigure the accelerator, referred to herein as reload overhead. However, the embodiments herein describe a host program that includes jump logic for instructing an accelerator program in the accelerator to execute different functions without the overhead of reconfiguring the accelerator. At start up when the host program is first executed, the accelerator program is loaded in the accelerator, but does not have to be executed. At runtime, when the accelerator functions are called, the host program executing in the host dispatches instructions to execute a corresponding portion of the accelerator program executing in the accelerator. That is, the methods or system calls in the host program corresponding to the different accelerator functions then use jump logic to pass function selection values to the accelerator program that inform the accelerator program which function it is being instructed to perform. This jump logic can be generated by an accelerator compiler and then inserted into the host program when a host compiler generates the executable (e.g., the compiled binary) for the host program.

Figure 1:
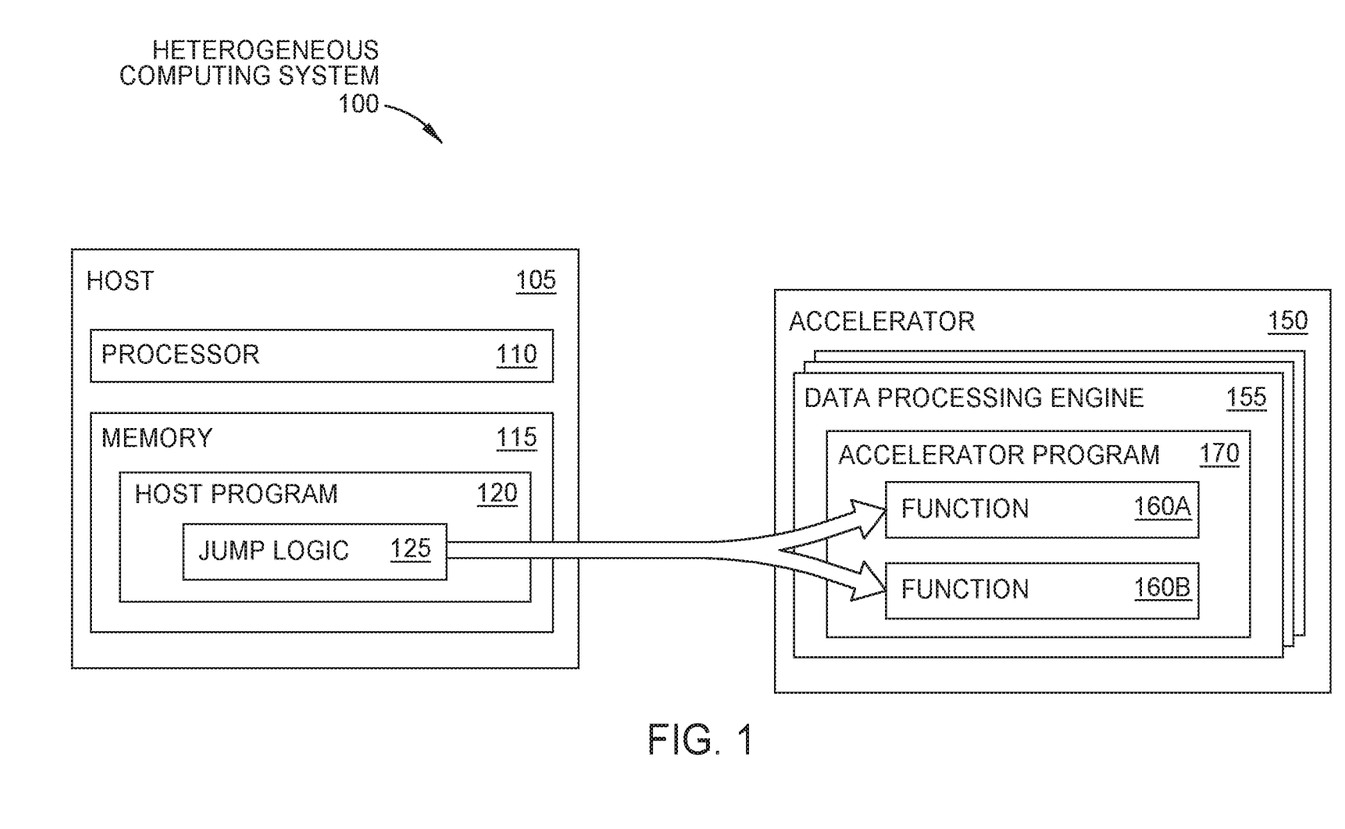
FIG. 1 is a block diagram of a heterogeneous computing system for executing multiple functions in an accelerator, according to an example.

FIG. 1 is a block diagram of a heterogeneous computing system 100 for executing multiple functions in an accelerator 150, according to an example. The heterogeneous computing system 100 includes a host 105 and the accelerator 150. The host 105 can be any type of computing system such as a server, desktop, blade, smartphone, and the like. Further, the host 105 can be a collection of computing systems (e.g., a cluster of computing nodes in a data center).

The host 105 includes a processor 110 which represents any number of processing elements which each can include any number of processing cores. The host 105 also includes memory 115 which can be volatile memory, nonvolatile memory, and combinations thereof. As shown, the memory 115 includes a host program 120 which includes jump logic 125 for indicating which function 160 an accelerator program 170 executing in the accelerator 150 should perform. That is, FIG. 1 illustrates a single host program 120 that can instruct the accelerator 150 to perform multiple, different accelerator functions 160. As described in detail below, the host program 120 can switch between these functions 160 without requiring the host 105 to reconfigure the accelerator 150 thereby avoiding reload overhead. In one embodiment, using the instructions in the host program 120, the host 105 can load the accelerator program 170 into the accelerator 150 to perform multiple functions 160 (e.g., when the host program 120 is first executed) and then use the jump logic 125 to switch (or jump) between the functions 160 seamlessly.

The accelerator 150 can be an integrated circuit (IC) or a combination of ICs. In one embodiment, the accelerator 150 is a system on a chip (SoC). In another embodiment, the SoC can include programmable logic (e.g., a programmable IC) as well as non-programmable logic (e.g., hardened circuitry). In one embodiment, the accelerator 150 is a field programmable gate array (FPGA). In one embodiment, the accelerator 150 has its own program memory for storing an executable (e.g., the accelerator program 170). Further, the accelerator 150 can be any type of accelerator that includes a processor such as a graphics processing engine (GPU), SoC, and the like. In general, the accelerator 150 can be any IC that can perform acceleration tasks for the host 105. Further, the accelerator 150 may be mounted in the same form factor as the host 105, or may be disposed in a different container than the host 105.

Figure 2:
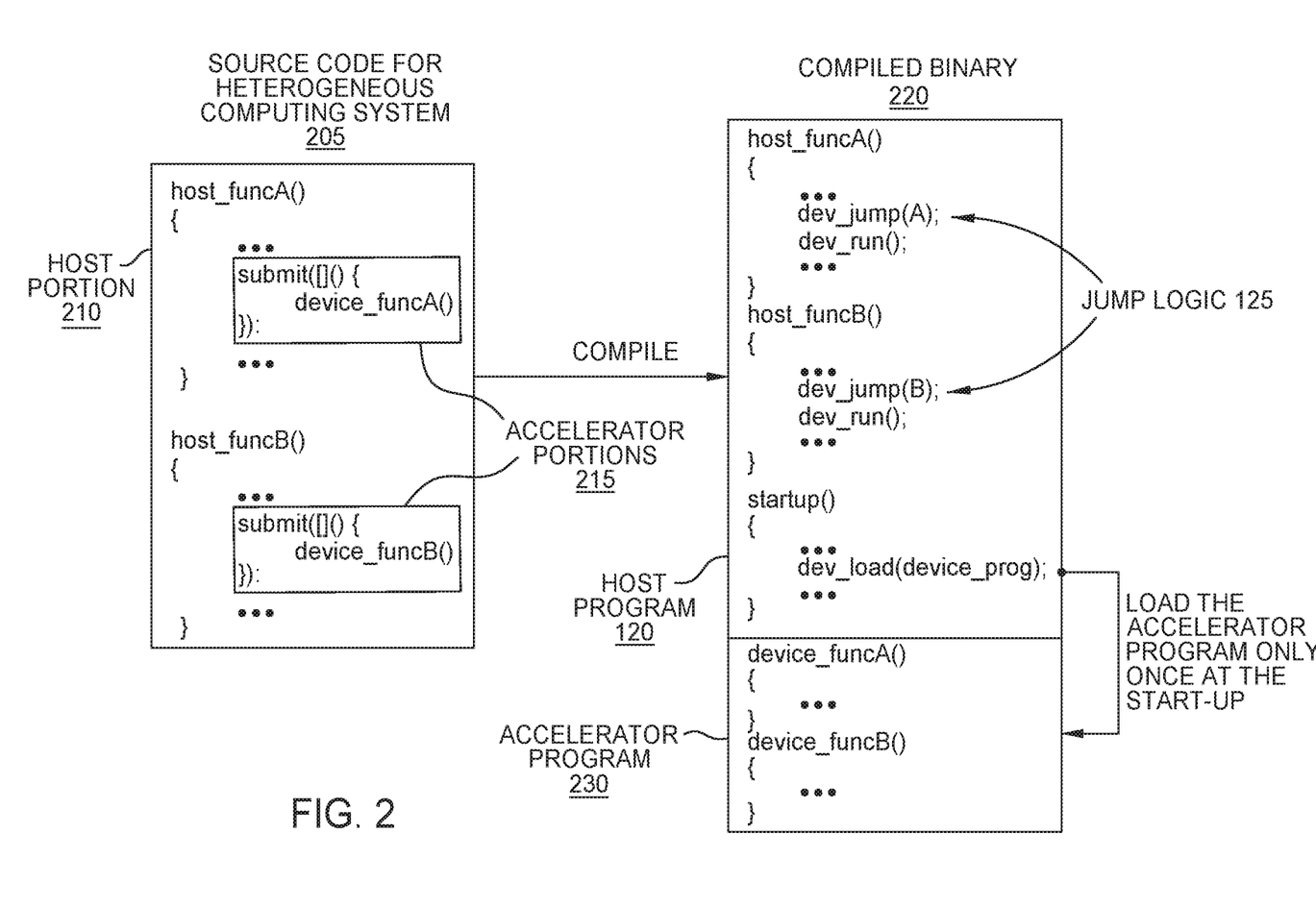
FIG. 2 illustrates compiled binary derived from source code for a heterogeneous computing system, according to an example.

The accelerator 150 can perform any type of accelerator task. The accelerator 150 can execute different layers in a ML model, switch between data compression and decompression, perform different tasks corresponding to wireless transmissions, perform cryptography, perform different graphic processing functions, and the like. In FIG. 2, the accelerator 150 includes a plurality of data processing engines (DPEs) 155. In one embodiment, the DPEs 155 are formed from software-configurable hardened logic—i.e., are hardened, One advantage of doing so is that the DPEs 155 may take up less space in the accelerator 150 relative to using programmable logic to form the hardware elements in the DPEs 155, That is, using hardened logic circuitry to form the hardware elements in the DPE 155 such as program memories, an instruction fetch/decode unit, fixed-point vector units, floating-point vector units, arithmetic logic units (ALUs), multiply accumulators (MAC), and the like can significantly reduce the footprint of the DPEs 155 in the accelerator 150. Although the DPEs 155 may be hardened, this does not mean the DPEs 155 are not programmable. That is, the DPEs 155 can be configured when the accelerator 150 is powered on, rebooted, or at runtime to perform the different functions 160 or tasks.

In one embodiment, the DPEs 155 are arranged in an array, although this is not a requirement. For example, the DPEs 155 may be arranged in a grid, duster, or checkerboard pattern in the accelerator 150. In one embodiment, the DPEs 155 are arranged in a 2D array with rows and columns but the embodiments are not limited to this arrangement. Further, the array can be any size and have any number of rows and columns of DPEs 155.

In one embodiment, the DPEs 155 are identical. That is, each of the DPEs 155 (also referred to as tiles or blocks) may have the same hardware components or circuitry. Further, the embodiments herein are not limited to DPEs 155. Instead, the accelerator 150 can include an array of any kind of processing elements, for example, the accelerator 150 could be digital signal processing engines, cryptographic engines, Forward Error Correction (FEC) engines, or other specialized hardware for performing one or more specialized tasks which are formed from hardened or programmable logic.

In one embodiment, the DPEs 155 are all the same type (e.g., a homogeneous array). However, in another embodiment, the accelerator 150 may include different types of engines. For example, the DPEs 155 may include a mix of digital signal processing engines, cryptographic engines, graphic processing engines, and the like. Regardless whether the DPEs 155 are homogenous or heterogeneous, the DPEs 155 can include direct connections between neighboring DPEs 155 which permit the DPEs 155 to transfer data directly.

Although not shown, the accelerator 150 can include an interface block (also referred to as a shim) that serves as a communication interface between the DPEs 155 and other hardware components in the accelerator 150. For example, the accelerator 150 may include a network on chip (NoC) that is communicatively coupled to the interface block. The NoC may extend throughout the accelerator 150 to permit the various components in the accelerator 150 to communicate with each other. For example, in one physical implementation, the DPEs 155 may be disposed in an upper right portion of the integrated circuit forming the accelerator 150. However, using a NoC, the DPEs 155 can nonetheless communicate with, for example, programmable logic (PL), a processor subsystem (PS) or input/output (I/O) circuitry which may disposed at different locations throughout the accelerator 150.

As shown, the host 105 has configured the DPEs 155 to perform at least two different functions: function 160A and function 160B. When executing the host program 120 on the host 105, the program 120 can seamlessly switch between instructing the DPEs 155 to perform the function 160A and the function 160B. That is, when starting up the host program 120 in the host, the host program 120 can configure the DPEs 155 to perform both of the functions 160A and 160B although the program 120 instructs the DPEs 155 to perform only one of the functions 160A and 164B at any given time. The host program 120 can instruct the accelerator program 170 the DPEs 155 to seamlessly switch to executing the different functions 160 without requiring the DPEs 155 to be reconfigured. That is, the jump logic 125 can provide information that indicates to the DPEs 155 whether it should perform the first function 160A or the second function 160B.

FIG. 2 illustrates compiled binary 220 derived from source code 205 for a heterogeneous computing system, according to an example. The source code 205 may be written using an object oriented programming language— e.g., C, C++, Java, and the like. In one embodiment, the source code 205 uses a heterogeneous programming model where the source code 205 includes a host portion 210 for defining functions performed by a first computing system (e.g., the host) and accelerator portions 215 defining functions performed by a second, different computing system (e.g., the accelerator). As shown, the host portion 210 of the source code 205 defines two functions: funcA and funcB. To perform these functions, the host may perform some tasks (which are specified in the host portion 210) and the accelerator performs other tasks (which are specified in the accelerator portion 215). For example, funcA and funcB may correspond to executing two different layers in a ML model. The host may be tasked with preparing data (in a particular format) so it can be submitted to the accelerator for processing. The host portion 210 includes the tasks performed by the host when preparing the data, while the accelerator portions 215 includes the tasks performed by the accelerator when processing the data prepared by the host according to the ML model.

The source code is then compiled to generate the compiled binary 220 defining the host program 120 (which executes on the host in order to submit tasks to the accelerator) and the accelerator program 170 which executes in the accelerator. That is, the host program 120 is a software program for enabling the host to offload tasks to the accelerator. The accelerator program 170 is firmware or software that permits the accelerator to execute multiple functions. As described in more detail below, the source code 205 may be compiled by a compiler that is compatible with a heterogeneous programming model. That is, the compiler can distinguish between the portions in the source code 205 intended for the host (i.e., the host portion 210) and the portions in the source code 205 intended for the accelerator (i.e., the accelerator portion 215).

In this example, the compiled binary 220 includes the host program 120 for defining the tasks performed by the host when executing funcA and funcB and the accelerator program 170 which defines tasks, that when executed by the accelerator, perform funcA and funcB. In one embodiment, the accelerator program 170 includes instructions that the host transmits to the accelerator in order to configure the DPEs in the accelerator to perform funcA and funcB.

When generating the compiled binary 220, the compiler generates jump logic 125 which is embedded in the host program 120. The jump logic 125 provides function selection values, such as memory pointers or function Ds, that when received at the accelerator, instruct the accelerator to perform either funcA or funcB. That is, when the host program executes funcA, the host executes dev_jump(A) in the jump logic which passes the function selection value "A" to the accelerator. The value "A" can be a memory pointer or a function ID that instructs the DPEs in the accelerator to perform funcA. The host then executes dev_run( ) which in turn provides instructions to the accelerator for performing funcA.

Similarly, the compiled binary 220 includes method host funcB which includes the method dev_jump(B) which passes the function selection value "B" to the accelerator program 170. The value "B" can be a memory pointer or function ID which instructs the DPEs in the accelerator to perform funcB rather than funcA. The host then executes dev_run( ) which in turn provides instructions to the accelerator for performing funcB.

To minimize overhead, the compiler generates a startup method in the compiled binary 220 which is executed once, when the host program 120 first begins to execute in the host. The startup method includes dev_load which instructs the host to load the accelerator program 170 of the compiled binary 220 into the accelerator. Advantageously, in one embodiment, the accelerator program 170 is only once into the accelerator. The host program 120 can then use the jump logic 125 to switch between funcA and funcB without again loading a different program into the accelerator (i.e., without transmitting another configuration bitstream to the accelerator, thereby avoiding reload overhead).

Figure 3:
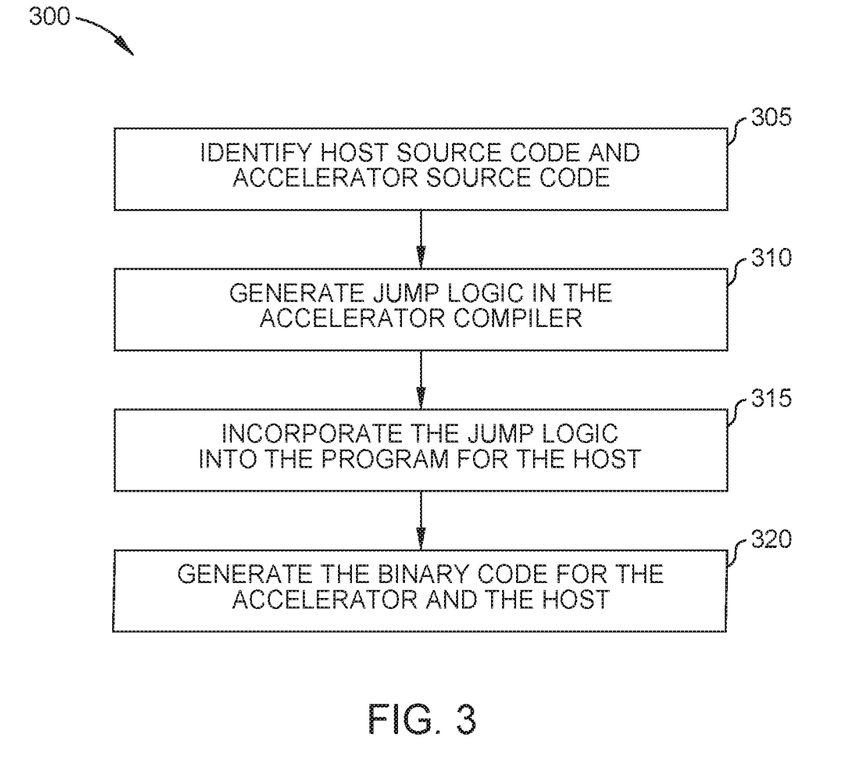
FIG. 3 is a flowchart for generating jump logic for performing multiple accelerator functions, according to an example.

FIG. 3 is a flowchart of a method 300 for generating jump logic for performing multiple accelerator functions, according to an example. That is, the method 300 may be performed by a compiler to generate jump logic for seamlessly switching between accelerator functions. For clarity, the blocks of the method 300 are discussed in tandem with FIGS. 4 and 5 which are block diagrams of compilers for generating jump logic for performing multiple accelerator functions, according to examples.

At block 305, the compiler identifies host source code and accelerator source code. In one embodiment, the compiler is compatible with a heterogeneous programming model where the same source code (e.g., the source code 205 in FIG. 2) can include host source code (e.g., the host portion 210) that defines tasks performed by a first computing device and accelerator source code (e.g., the accelerator portions 215) that defines tasks performed by a second computing device. Moreover, the first and second computing devices are different types of computing devices (e.g., a host versus an accelerator).

There are many different types of heterogeneous programming models that can be used to write source code for heterogeneous computing systems. Some non-limiting programming models that can be used include SYCL, OpenCL, or OpenGL. The programming models (and the corresponding compilers) can identify source code for heterogeneous computing systems and then compile that source code to result in compiled code (e.g., a compiled binary) for enabling the heterogeneous computing systems to work together to complete tasks.

Figure 4:
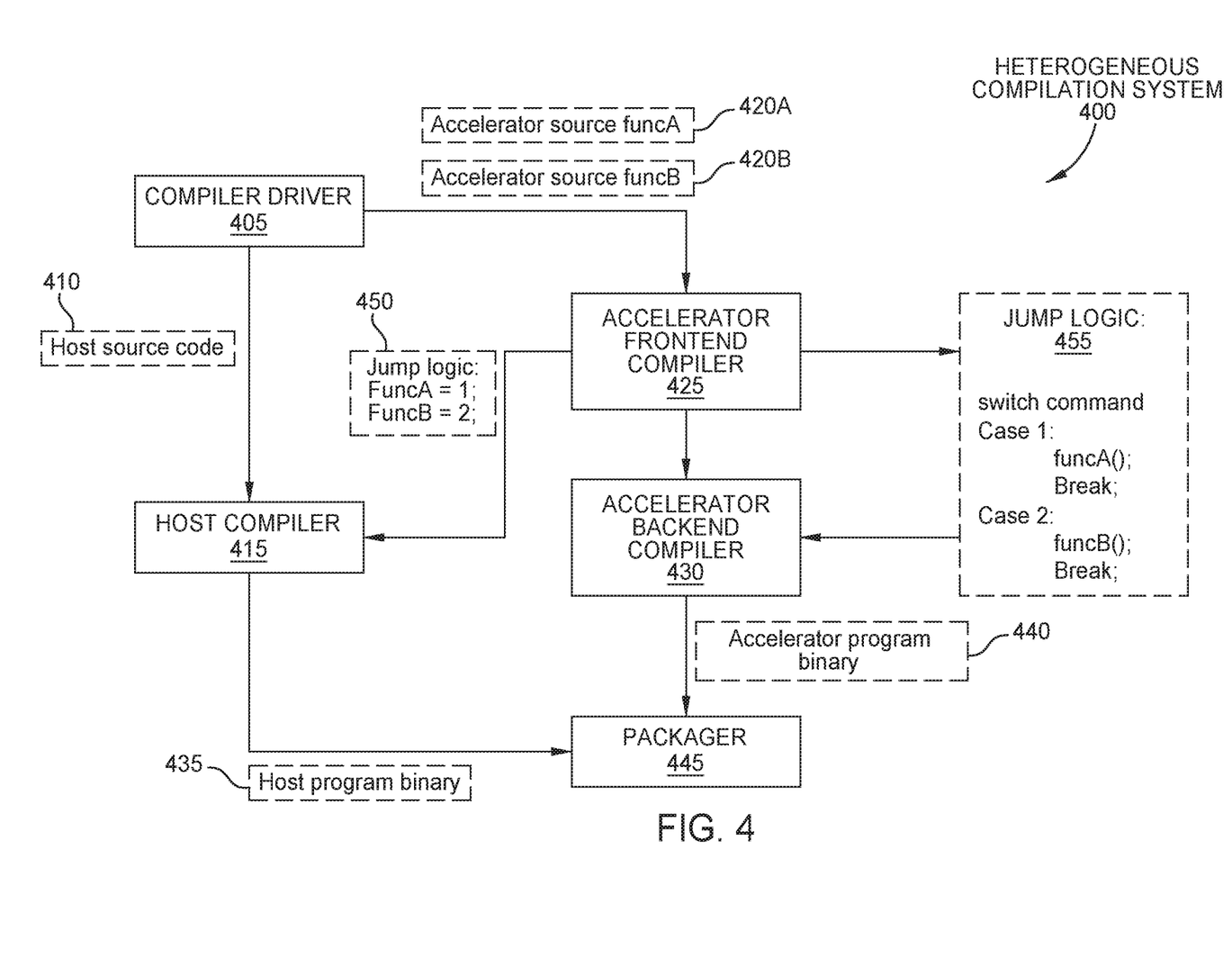
FIGS. 4 and 5 are block diagrams of compilers for generating jump logic for performing multiple accelerator functions, according to examples.
Figure 5:
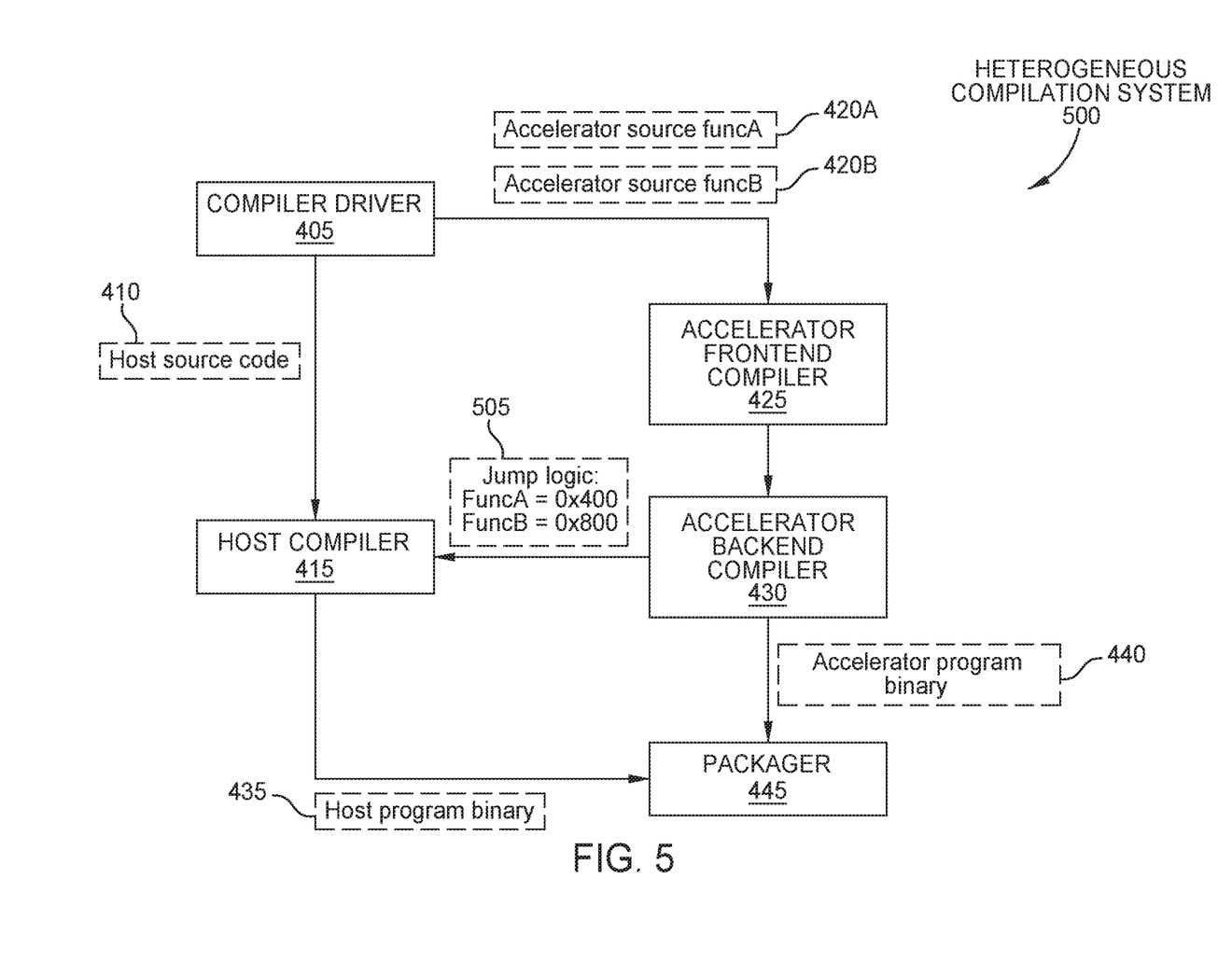

FIGS. 4 and 5 both illustrate respective heterogeneous compilation systems 400, 500 which can perform the method 300. As shown. FIGS. 4 and 5 include a compiler driver 405 that receives source code and identifies host source code 410, accelerator source code 420A for funcA, and accelerator source code 420B for funcB. That is, the compiler driver 405 can perform block 305 where it identifies host source code 410 defining the tasks performed by the host when executing funcA and funcB and accelerator source code 420A and 420B including instructions for configuring the accelerator to perform funcA and funcB. However, in other embodiments, the respective host and accelerator compilers identify their respective code in the source file rather than the compiler driver 405. These compilers can use macros to identify the code that is relevant to them.

At block 310, an accelerator compiler generates jump logic for switching between accelerator functions. That is, the heterogeneous programming model can include an accelerator compiler that receives the accelerator source code and generates jump logic that the host can use to switch between the accelerator functions. FIGS. 4 and 5 both include an accelerator frontend compiler 425 which receives the accelerator source code 420A and 420B for funcA and funcB. In FIG. 4, the accelerator frontend compiler 425 generates jump logic 450 which assigns the functions two unique function IDs. In this example, funcA is assigned the function ID "1" while the funcB is assigned the function ID "2". This assignment (or mapping) is then transmitted to a host compiler 415. In addition to providing the function ID assignment to the host compiler 415, the accelerator frontend compiler 425 generates jump logic 455 which provides logic that the accelerator can use to determine whether it should perform funcA or funcB. In this example, the jump logic 455 includes a switch command where if a function ID with a value of "1" is received (i.e., Case 1), the accelerator should perform funcA; however, if a function ID with a value of "2" is received (i.e., Case 2), the accelerator should perform funcB. As shown, the jump logic 455 is forwarded to an accelerator backend compiler 430 which is generally tasked with generating the code that configures the accelerator to perform funcA and funcB.

In contrast to FIG. 4 where the accelerator frontend compiler 425 provides the jump logic, in FIG. 5 the accelerator backend compiler 430 provides jump logic 505 to the host compiler 415. In this example, the jump logic 505 loads memory pointer values corresponding to funcA and funcB into a Program Counter (PC) (or counters) of the DPEs in the accelerators to switch between accelerator functions. That is, loading a value of 0x400 into the PC causes the DPEs to perform funcA while loading the value of 0x800 into the PC causes the DPEs to perform funcB. Stated differently, when the PC is loaded with the value of 0x400, the DPEs begin to execute instructions corresponding to funcA, but when the PC is loaded with the value of 0x800, the DPEs begin executing instructions corresponding to funcB. In this manner, depending on which PC value the host passes to the accelerator, determines which function the DPEs in the accelerator perform. Typically, the accelerator backend compiler 430 identifies the PC values corresponding to the accelerator function funcA and funcB, but this is not a requirement. In other heterogeneous compilation system, the frontend compiler 425 may be able to assign PC values to the functions in which case it provides the jump logic 505 to the host compiler 415.

Thus, FIGS. 4 and 5 illustrate different heterogeneous compilation systems 400, 500 where function IDs or memory pointers (e.g., function selection values) can be assigned to the accelerator functions. As mentioned above, when executing the host program, the host can pass the function IDs or pointers to the accelerator, thereby instructing the accelerator to perform one of the multiple functions it was previously configured to perform. For example, in the example illustrated in FIG. 4, the host can pass either a "1" or a "2" as the function ID (e.g., when executing dev_jump as shown in FIG. 2) to switch between funcA and funcB. In turn, the accelerator can use the switch command in the jump logic 455 to then map the received function ID to one of the functions funcA and funcB. In the example illustrated in FIG. 5, the host passes a PC value to the accelerator (again using dev_jump) so that the PCs in the DPEs start at instructions corresponding to one of funcA or funcB.

Returning to the method 300, at block 315 the host compiler incorporates the jump logic into the program for the host. This is illustrated in FIG. 2 where the host portion 225 includes jump logic 125 where different function selection values A or B (e.g., different function IDs or pointers) are passed to the accelerator depending on which function the accelerator should perform.

At block 320, the heterogeneous compilation system generates binary code for the accelerator and the host. This is illustrated in FIGS. 4 and 5 where the host compiler 415 generates a host program binary 435 and the accelerator backend compiler 430 generates an accelerator program binary 440. A packager 445 then combines the host program binary 435 and the accelerator program binary 440 to result in compiled code (e.g., the compiled binary 220 in FIG. 2).

While the compilation systems 400 and 500 can execute in the host, this is not a requirement. In some implementations, the compilation systems 400 and 500 may be executed using computing systems that are separate from the heterogeneous computing systems. For example, a programmer may write and then compile the source code on a workstation and then provide that compiled code (e.g., the host and accelerator programs) to a datacenter or a smartphone that includes the heterogeneous computing systems (e.g., hosts and accelerators) for which the source code was written. In another embodiment, the compilation systems 400 and 500 may be executed at runtime.

Figure 6:
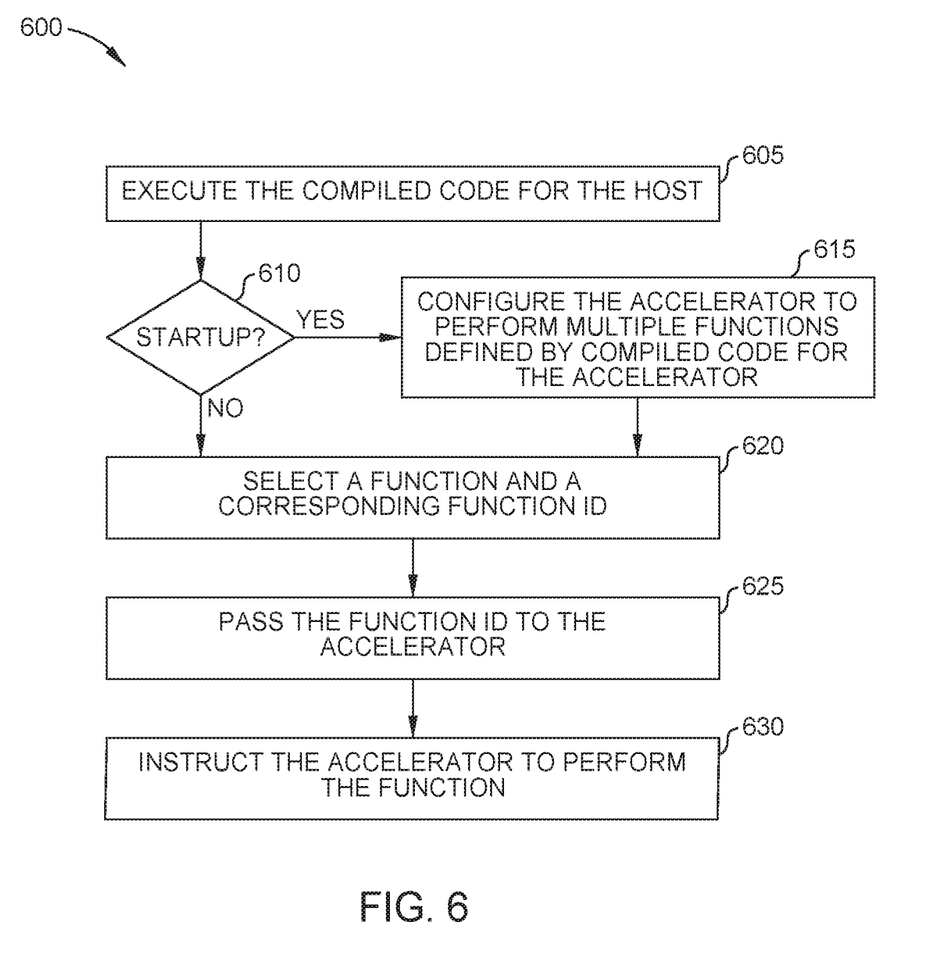
FIGS. 6 and 7 are flowcharts for executing compiled code containing jump logic for performing multiple accelerator functions, according to an example.
Figure 7:
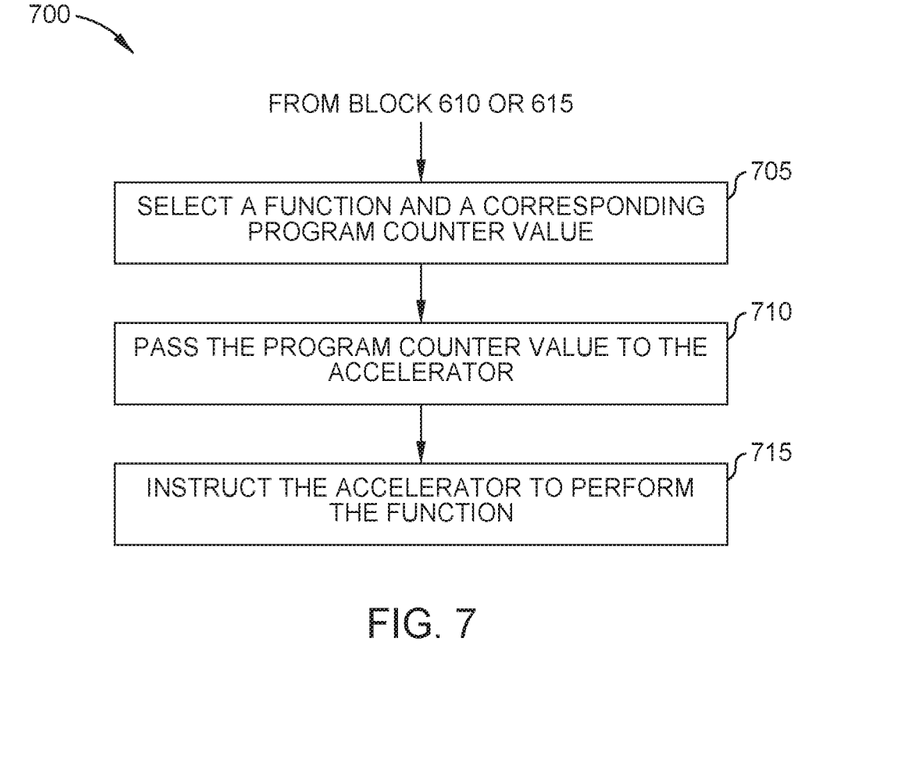

FIGS. 6 and 7 are flowcharts for executing compiled code containing jump logic for performing multiple accelerator functions, according to an example. FIG. 6 illustrates a method 600 for executing compiled code that was compiled using the heterogeneous compilation system 400 in FIG. 4, while FIG. 7 illustrates a method 700 for executing compiled code compiled using the heterogeneous compilation system 500 in FIG. 5.

Turning to the method 600, at block 605 the host executes the compiled code for the host (e.g., the host program 120 in FIGS. 1 and 2).

At block 610, the host determines whether the compiled code is being started up—i.e., whether this is the first time the compiled code (e.g., the host program) has been executed, which may be part of program initialization. If so, the method 600 proceeds to block 615 where the host load an compiled code for the accelerator (e.g., the accelerator program 170 in FIGS. 1 and 2) into the accelerator which includes instructions for configuring the accelerator to perform multiple (different) functions. Otherwise, the method 600 proceeds directly to block 620.

At block 620, the host selects a function and a corresponding function ID. That is, the host determines which function it would like the accelerator to perform and then selects the corresponding function ID. In this embodiment, each accelerator function is assigned a unique function ID. As discussed above, the mapping between the accelerator functions and the function IDs is generated during compilation and is provided to the host compiler so that the function IDs can be used when executing the host and accelerator programs.

At block 625, the host passes the function ID to the accelerator. In FIG. 2, this is performed by the argument "A" or "B" in the dev_jump.

At block 630, the host instructs the accelerator to perform the function. In FIG. 2, this is performed when executing dev_run in the host portion 225.

In FIG. 7, the method 700 begins after block 610 or 615 of the method 600 has been performed. However, instead of using a function ID to switch between accelerator tasks, at block 705, the host selects a function and a corresponding PC value (e.g., a memory pointer corresponding to the select function). That is, the instructions for each function may be stored in memory in the accelerator. By loading the address of the beginning instruction of the selected function (e.g., the addresses 0x400 or 0x800 as illustrated in FIG. 5) into the PC, the host ensures the accelerator performs the selected function.

At block 710, the host passes the PC value to the accelerator.

At block 715, the host instructs the accelerator to perform the function. Because the PC is set to the first instruction corresponding to the selected function, as the DPEs begin to execute, the PC loads instructions corresponding to the selected function. That is, when the host executes dev_run, the PC in the accelerator is set to execute the selected function.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, holographic, molecular (DNA), quantum mechanics, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method for compiling source code for a heterogeneous computing system comprising a host and an accelerator, the method comprising:
   identifying host source code and accelerator source code;
   generating, using one or more computing processors executing a compiler, function selection values for jump logic based on the accelerator source code, wherein the function selection values in the jump logic enables the host to switch between multiple accelerator functions, and wherein each of the function selection values provides a link to a different one of the multiple accelerator functions;
   generating compiled code for the host based on the host source code and the jump logic, wherein generating the compiled code for the host includes embedding the function selection values into the compiled code for the host; and
   generating compiled code for the accelerator based on the accelerator source code.

2. The method of claim 1, wherein the function selection values are unique function IDs, and wherein generating the jump logic comprises:
   mapping the multiple accelerator functions to the unique function IDs, wherein the compiled code for the host is generated using the mapping.

3. The method of claim 2, wherein the compiled code for the host comprises a different method for each of the multiple accelerator functions, wherein each of the different methods passes a different one of the function IDs to the accelerator when executed.

4. The method of claim 1, wherein the function selection values are memory pointers, and wherein generating the jump logic comprises:
   identifying the memory pointers corresponding to the multiple accelerator functions, wherein the compiled code for the host is generated using the memory pointers.

5. The method of claim 4, wherein the compiled code for the host comprises different methods for each of the multiple accelerator functions, wherein each of the different methods passes a different one of the memory pointers to the accelerator when executed.

6. The method of claim 5, wherein the memory pointers are passed as program counter (PC) values that are loaded into at least one PC in the accelerator.

7. The method of claim 1, wherein generating the compiled code for the host further comprises:
   generating a startup method that is only executed when the compiled code for the host begins to execute on the host, the startup method instructs the host to load the compiled code for the accelerator in order to configure the accelerator to perform the multiple accelerator functions.

8. The method of claim 7, wherein after configuring the accelerator to perform the multiple accelerator functions, the compiled code for the host is configured to switch between the multiple accelerator functions, using the jump logic, without first requiring the compiled code for the accelerator to be updated or re-loaded.

9. A non-transitory computer readable storage medium comprising computer readable program code embodied therewith, the computer-readable program code executable by a processor to perform an operation to compile source code for a heterogeneous computing system comprising a host and an accelerator, the operation comprises:
   identifying host source code and accelerator source code;
   generating, using one or more computing processors executing a compiler, function selection values for jump logic based on the accelerator source code, wherein the function selection values in the jump logic enables the host to switch between multiple accelerator functions, and wherein each of the function selection values provides a link to a different one of the multiple accelerator functions;
   generating compiled code for the host based on the host source code and the jump logic, wherein generating the compiled code for the host includes embedding the function selection values into the compiled code for the host; and
   generating compiled code for the accelerator based on the accelerator source code.

10. The non-transitory computer readable storage medium of claim 9, wherein the function selection values are unique function IDs, and wherein generating the jump logic comprises:
    mapping the multiple accelerator functions to the unique function IDs, wherein the compiled code for the host is generated using the mapping.

11. The non-transitory computer readable storage medium of claim 10, wherein the compiled code for the host comprises a different method for each of the multiple accelerator functions, wherein each of the different methods passes a different one of the function IDs to the accelerator when executed.

12. The non-transitory computer readable storage medium of claim 9, wherein the function selection values are memory pointers, and wherein generating the jump logic comprises:
    identifying memory pointers corresponding to the multiple accelerator functions, wherein the compiled code for the host is generated using the memory pointers.

13. The non-transitory computer readable storage medium of claim 12, wherein the compiled code for the host comprises different methods for each of the multiple accelerator functions, wherein each of the different methods pass a different one of the memory pointers to the accelerator when executed.

14. The non-transitory computer readable storage medium of claim 13, wherein the memory pointers are passed as PC values that are loaded into at least one PC in the accelerator.

15. A method comprising:
    executing, in a host, compiled code for the host, wherein an accelerator is communicatively coupled to the host;
    configuring the accelerator to perform multiple functions using compiled code for the accelerator;
    selecting, when executing the compiled code at the host, a first function of the multiple functions, wherein the compiled code for the host comprises jump logic containing function selection values embedded into the compiled code and indicating which of the multiple functions has been selected, and wherein each of the function selection values provides a link to a different one of the multiple functions of the accelerator;

passing a selected one of the function selection values to the accelerator; and instructing the accelerator to perform the first function.

16. The method of claim 15, wherein the jump logic is based on mapping the multiple functions to unique function IDs, wherein passing the selected one of the function selection values to the accelerator comprises passing a function ID corresponding to the first function to the accelerator.

17. The method of claim 16, wherein the compiled code comprises a different method for each of the multiple functions, wherein each of the different methods pass a different one of the function IDs to the accelerator when executed.

18. The method of claim 15, wherein the jump logic is based on memory pointers corresponding to the multiple functions, wherein passing the selected one of the function selection values to the accelerator comprises passing a memory pointer corresponding to the first function to the accelerator.

19. The method of claim 18, wherein the compiled code for the host comprises different methods for each of the multiple functions, wherein each of the different methods pass a different one of the memory pointers to the accelerator when executed.

20. The method of claim 19, wherein the memory pointers are passed as PC values that are loaded into at least one PC in the accelerator.

* * * * *